United States Patent
Yale et al.

(10) Patent No.: US 9,827,489 B2
(45) Date of Patent: Nov. 28, 2017

(54) GAMING METHOD AND SYSTEM FOR PROJECTING VOLUMETRIC IMAGES ONTO A PHYSICAL SCENE

(71) Applicant: TRIOTECH AMUSEMENT INC., Joliette (CA)

(72) Inventors: Ernest Yale, Repentigny (CA); Eric Marradi, Montreal (CA); Jean-Francois D'Arrisso, Saint-Leonard (CA); Yannick Solari, Longueuil (CA)

(73) Assignee: TRIOTECH AMUSEMENT INC., Joliette (CA)

( * ) Notice: Subject to any disclaimer, the term of this patent is extended or adjusted under 35 U.S.C. 154(b) by 156 days.

(21) Appl. No.: 14/887,743

(22) Filed: Oct. 20, 2015

(65) Prior Publication Data
US 2016/0136519 A1 May 19, 2016
Related U.S. Application Data

(60) Provisional application No. 62/080,748, filed on Nov. 17, 2014.

(51) Int. Cl.
| | | |
|---|---|---|
| *A63F 13/90* | (2014.01) | |
| *A63F 13/213* | (2014.01) | |
| *A63F 13/219* | (2014.01) | |
| *A63F 13/837* | (2014.01) | |
| *A63F 13/25* | (2014.01) | |
| *F41A 33/02* | (2006.01) | |
| *G09B 9/00* | (2006.01) | |
| *F41A 33/00* | (2006.01) | |

(52) U.S. Cl.
CPC .......... *A63F 13/213* (2014.09); *A63F 13/219* (2014.09); *A63F 13/25* (2014.09);
(Continued)

(58) Field of Classification Search
CPC ...... A63F 13/213; A63F 13/219; A63F 13/25; A63F 13/837; A63F 13/90; A63F 7/30;
(Continued)

(56) References Cited

U.S. PATENT DOCUMENTS

| | | | | |
|---|---|---|---|---|
| 5,382,026 A | * | 1/1995 | Harvard ............... | A63F 9/0291 463/30 |
| 2006/0072076 A1 | * | 4/2006 | Smoot ................... | G03B 15/10 353/34 |

(Continued)

FOREIGN PATENT DOCUMENTS

| | | |
|---|---|---|
| AU | 2006100154 A4 | 6/2006 |
| EP | 1310106 A1 | 5/2003 |

(Continued)

OTHER PUBLICATIONS

International Search Report of PCT/CA2015/051052, dated Jan. 20, 2016, Paul Sabharwal.

(Continued)

*Primary Examiner* — Damon Pierce
(74) *Attorney, Agent, or Firm* — BCF LLP (57) ABSTRACT

The present disclosure relates to a gaming system projecting volumetric images onto a physical scene that includes a background and props positioned in front of the background. A gaming engine causes a projector to project an image onto the physical scene. A pointer device receives triggering commands from an operator. A camera captures an image of a portion of the physical scene being targeted by the pointer device. The captured portion includes lighting points emitted by the physical scene, the captured lighting points forming a specific pattern. A targeting system uses the specific pattern as a reference to identify a three-dimensional position of a target located within the captured portion and causes the gaming engine to modify a visible feature of the target when a when a triggering command is received at the pointer device. A method of projecting volumetric images onto the physical scene is also disclosed.

26 Claims, 10 Drawing Sheets

(52) U.S. Cl.
CPC ............ *A63F 13/837* (2014.09); *A63F 13/90* (2014.09); *F41A 33/00* (2013.01); *F41A 33/02* (2013.01); *G09B 9/00* (2013.01); *G09B 9/003* (2013.01)

(58) Field of Classification Search
CPC . F41A 33/00; F41A 33/02; G09B 9/00; G09B 9/003
See application file for complete search history.

(56) References Cited

U.S. PATENT DOCUMENTS

| | | | |
|---|---|---|---|
| 2006/0287137 A1* | 12/2006 | Chu .................... | A63B 47/025 473/422 |
| 2008/0106746 A1 | 5/2008 | Zalevsky et al. | |
| 2010/0092041 A1* | 4/2010 | Kim .................. | G01B 11/2513 382/106 |
| 2013/0293732 A1* | 11/2013 | Bhrugumalla ........... | G09G 5/30 348/220.1 |

FOREIGN PATENT DOCUMENTS

| | | |
|---|---|---|
| EP | 1689172 A1 | 8/2006 |
| JP | 2009018012 A | 1/2009 |

OTHER PUBLICATIONS

English translation of JP2009018012A; retrieved from https://cipo.orbit.com/ by the Canadian Intellectual Property Office dated Jan. 20, 2016.

\* cited by examiner

GAMING METHOD AND SYSTEM FOR PROJECTING VOLUMETRIC IMAGES ONTO A PHYSICAL SCENE

TECHNICAL FIELD

The present disclosure relates to the field of gaming systems. More specifically, the present disclosure relates to a system and a method of projecting volumetric images onto a physical scene.

BACKGROUND

Gamers are increasingly demanding when it comes to the sensations offered by video gaming systems. Nothing can replace the feeling of being fully immersed in a scene where the action of a game takes place.

The feeling of being immersed into a scene may be provided with some level of success by three-dimensional (3D) video systems. However, 3D video gaming systems are complex and expensive, especially as regard to the need to impact a theme being shown on the scene as a function of actions taken by the gamer. The computational complexity required to offer a gaming experience in 3D is quite extreme.

Therefore, there is a need for gaming systems and methods that offer economical and simple solutions to the need for providing a feeling of immersion to gamers.

SUMMARY

According to the present disclosure, there is provided a method of projecting volumetric images onto a physical scene, the physical scene including a background and a plurality of props positioned in front of the background. An image is projected onto the physical scene. An image of a portion of the physical scene being targeted by a pointer device is captured. The captured portion includes lighting points emitted by the physical scene. The lighting points within the captured portion form a pattern specific to the captured portion. Using the pattern specific to the captured portion as a reference, a three-dimensional position of a target located within the captured portion is identified within the projected image. A triggering command is received at the pointer device. A visible feature of the target is modified within the projected image in response to the triggering command.

According to the present disclosure, there is also provided a gaming system projecting volumetric images onto a physical scene, the physical scene including a background and a plurality of props positioned in front of the background. The system comprises a projector, a gaming engine, a plurality of light emitters positionable on the physical scene, a pointer device, a camera and a targeting system. The gaming engine is operably connected to the projector and adapted to cause the projector to project an image onto the physical scene. The pointer device is adapted to receive triggering commands from an operator. The camera is adapted to capture an image of a portion of the physical scene being targeted by the pointer device. The captured portion includes lighting points emitted by at least a subset of the plurality of light emitters, the lighting points within the captured portion being arranged in a pattern specific to the captured portion. The targeting system is adapted to use the pattern specific to the captured portion as a reference to identify, within the projected image, a three-dimensional position of a target and to cause the gaming engine to modify within the projected image a visible feature of the target when a when a triggering command is received at the pointer device.

The present disclosure further relates to a gaming system projecting volumetric images onto a physical scene. The system comprises a background of the physical scene, a plurality of props positioned in front of the background, a projector, a gaming engine, a plurality of light emitters, including a first plurality of light emitters positioned on the background and a second plurality of light emitters positioned on the props, a pointer device, a camera and a targeting system. The gaming engine is operably connected to the projector and adapted to cause the projector to project an image onto the background and onto the props. The pointer device is adapted to receive triggering commands from an operator. The camera is adapted to capture an image of a portion of the physical scene being targeted by the pointer device. The captured portion includes lighting points emitted by at least a subset of the plurality of light emitters, the lighting points within the captured portion being arranged in a pattern specific to the captured portion. The targeting system is adapted to use the pattern specific to the captured portion as a reference to identify, within the projected image, a three-dimensional position of a target and to cause the gaming engine to modify within the projected image a visible feature of the target when a triggering command is received at the pointer device.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

Like numerals represent like features on the various drawings.

DETAILED DESCRIPTION

Various aspects of the present disclosure generally address one or more of the problems related to the need for providing a feeling of immersion to gamers.

Generally stated, the present technology provides volumetric images offering a three-dimensional (3D) immersion experience to gamers by projecting images on a 3D physical scene that includes a background and various props positioned in one or more planes in front of the background. A number of lighting points, for example infrared light emitting diodes (LED), are disseminated among the physical scene, for example by placing a few LEDs on each prop and by placing a number of other LEDs on the background. These lighting points are arranged in a constellation forming a variety of patterns, each pattern uniquely identifying a portion of the physical scene. A projector projects an image onto the physical scene. A pointer device, for example a "gaming gun" held by a gamer, points towards a target on the scene. The gamer depresses a trigger of the pointer device. A camera captures an image of a portion of the physical scene, the captured portion being identifiable by a specific pattern of lighting points. This information is provided by the camera to a targeting system that identifies a 3D position of the target within the physical scene based on the specific pattern of lighting points. The target may for example be centered within the captured portion. Coordinates of the 3D position are provided to a gaming engine that controls the content of the image projected on the physical scene. The gamer sees a modification of a feature of the image, at the target. For example, where the pointer device emulates a firearm, the gamer can see an impact of a bullet on the target.

Though the gamer can perceive being immersed within a gaming theme presented on the physical scene, the projected image may actually consist of a two-dimensional (2D) image. The perception of depth perceived by the gamer is provided in part by the placement of the props in planes located in front of the background and in part by the modification of features of the target, the target being located on the background or on one of the props. Of course, throughout the course of a game, the gamer may define several consecutive targets on any part of the scene. The following description will describe additional manners in which the gamer may perceive a volume of the projected image.

The following terminology is used throughout the present disclosure:

Volumetric image: an image that offers perception of being three dimensional.

Physical scene: an actual scene on which an image is projected, with the intent of forming a virtual scene.

Gaming engine: function running on a controller and used to play a virtual game and to show results of a real time interaction between a projected image and a gamer.

Lighting points: a plurality of points disseminated on the physical scene and arranged as a constellation forming a plurality of patterns, distinct patterns allowing to uniquely identify distinct portions of the physical scene.

Pointer device: input interface used by an operator, for example a gamer, the pointer device being usually shaped as a function of a gaming theme, capable of aiming at a target on a projected image, and capable of receiving a triggering command.

Target: a point being actually aimed at by the pointer device; any point of the physical scene, down to a single pixel, may form a target; in the context of the present disclosure, the target may differ from an intended target, when the gamer fails to aim properly.

Targeting system: function running on a controller and receiving triggering information from the pointer device for altering the course of a game.

Visible feature of a target: any modification of a projected image at and around the target, including without limitation a representation of a bullet impact, an explosion, a laser beam impact, and the like.

Controller: a processor, a computer, a combination of processors and/or computers, possibly including a transient memory and/or a non-transitory memory, an interface, and similar components, the controller may be hard-wired for carrying a function or may comprise programmable code for carrying a function.

Figure 1:
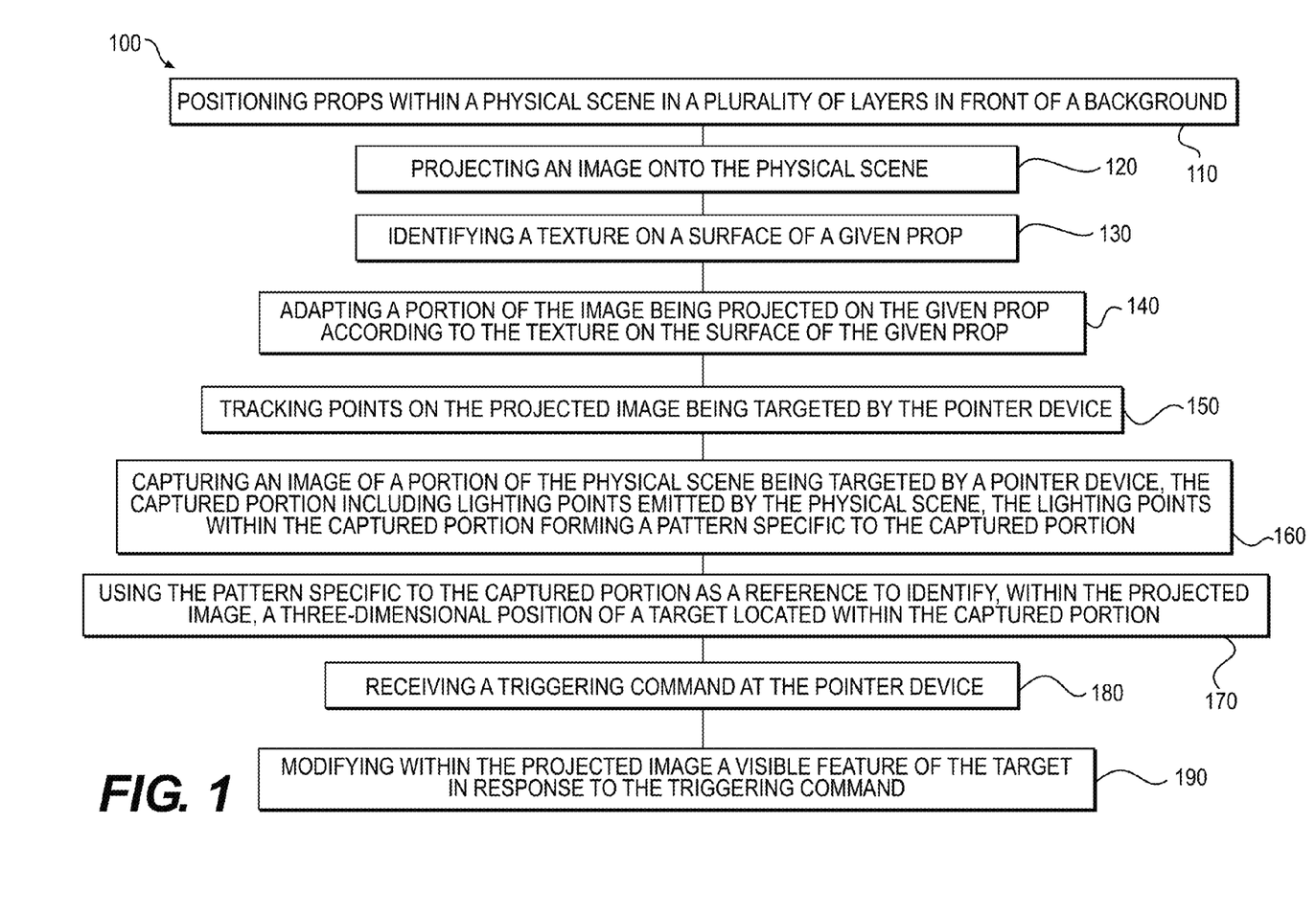
FIG. 1 is a sequence diagram showing operations of a method of projecting volumetric images onto a physical scene.
Figure 2A:
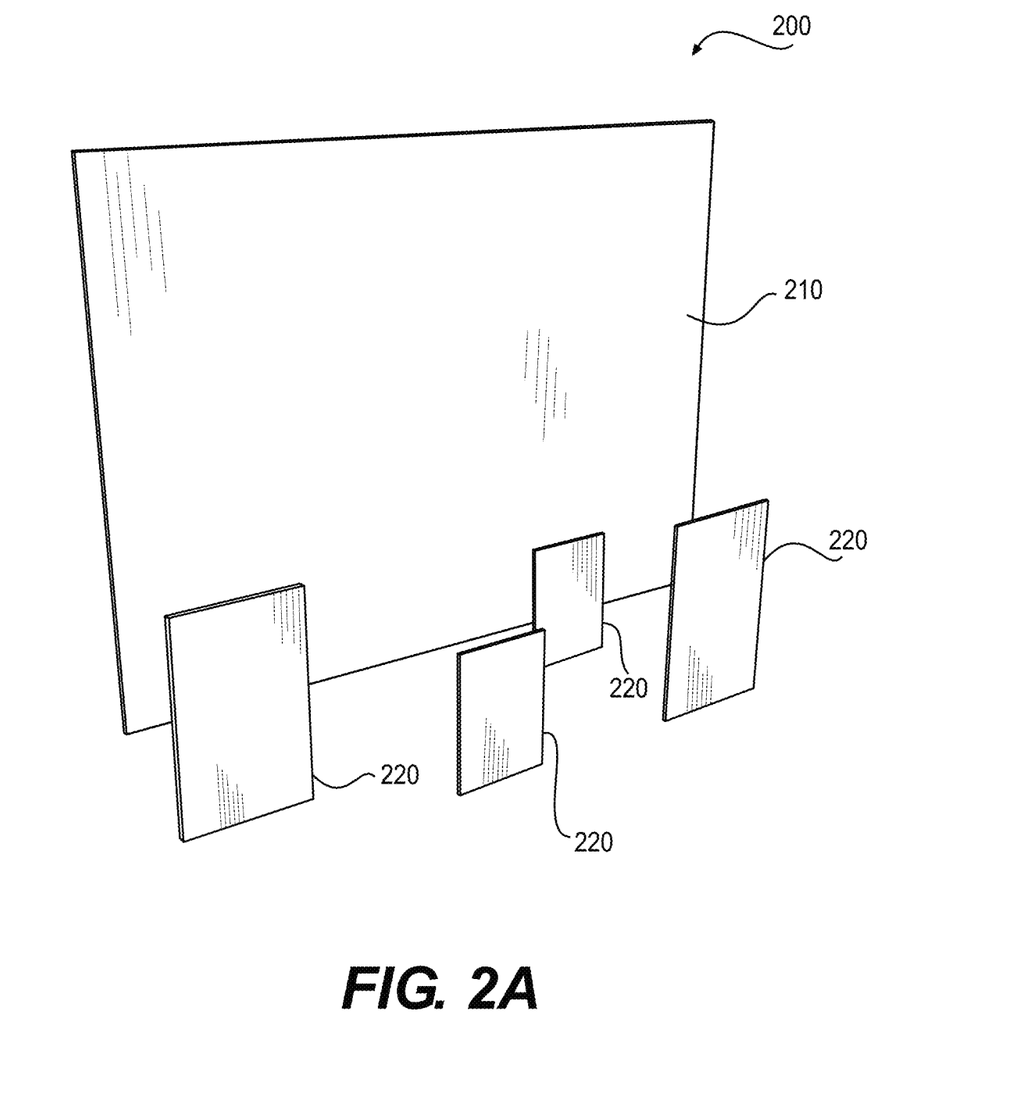
FIGS. 2a, 2b, 2c and 2d are perspective views, taken at various viewing angles, of an example of physical scene.
Figure 2B:
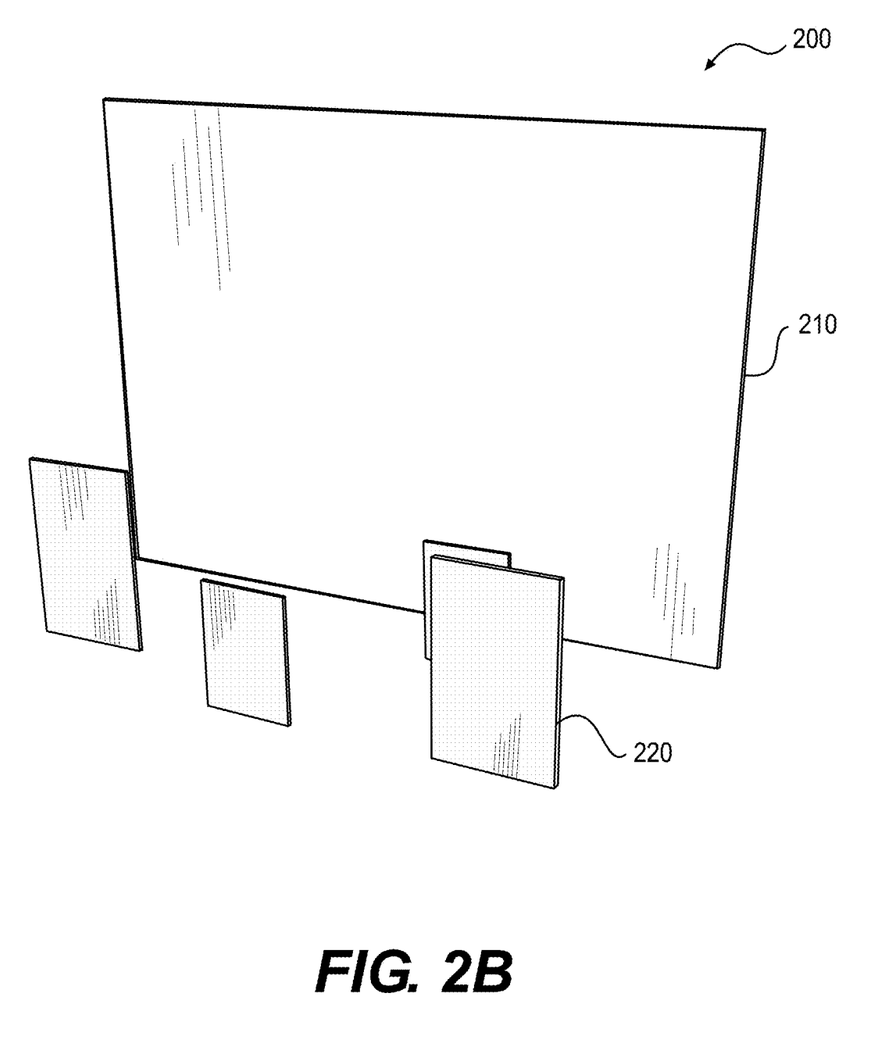
Figure 2C:
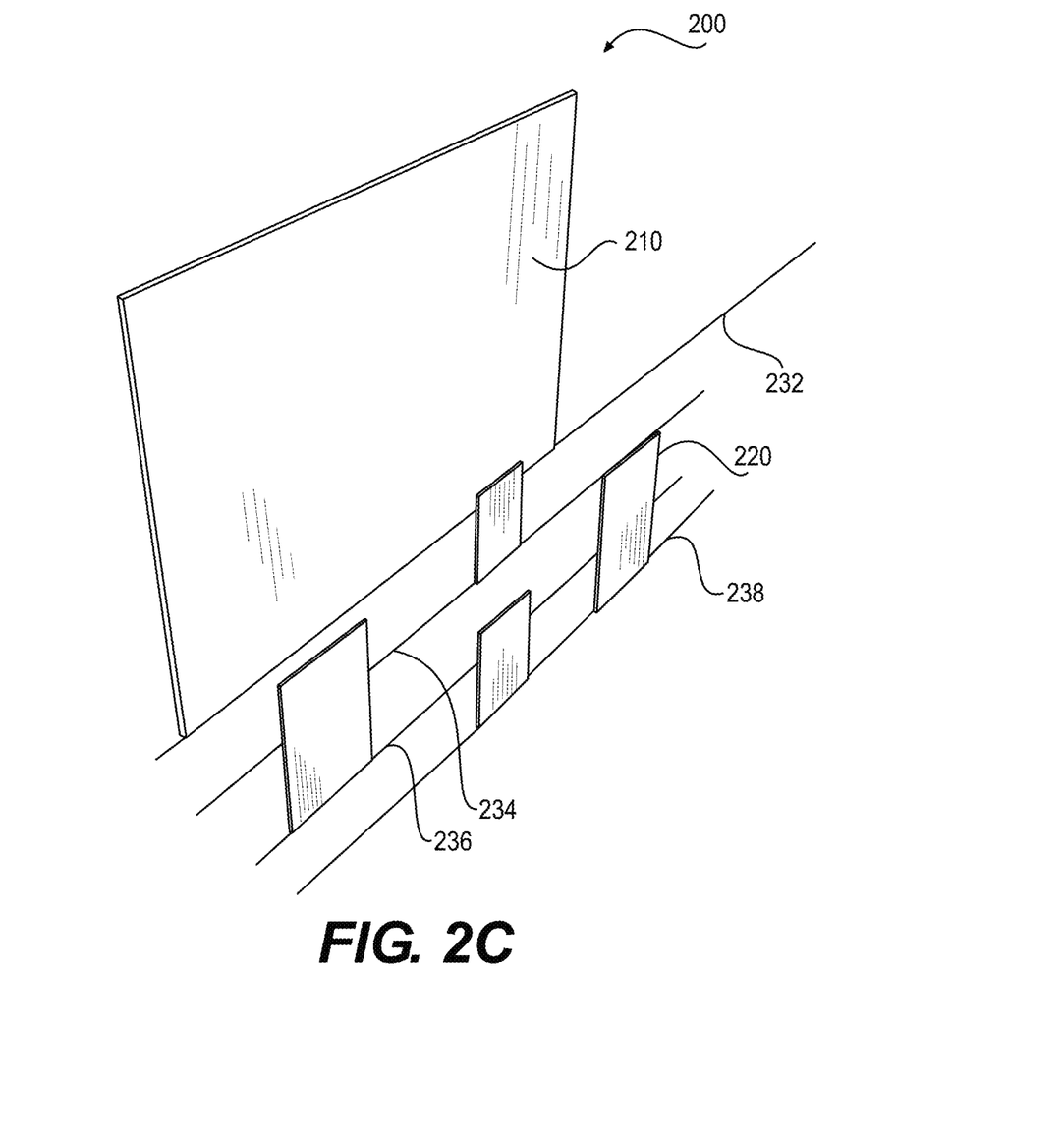
Figure 2D:
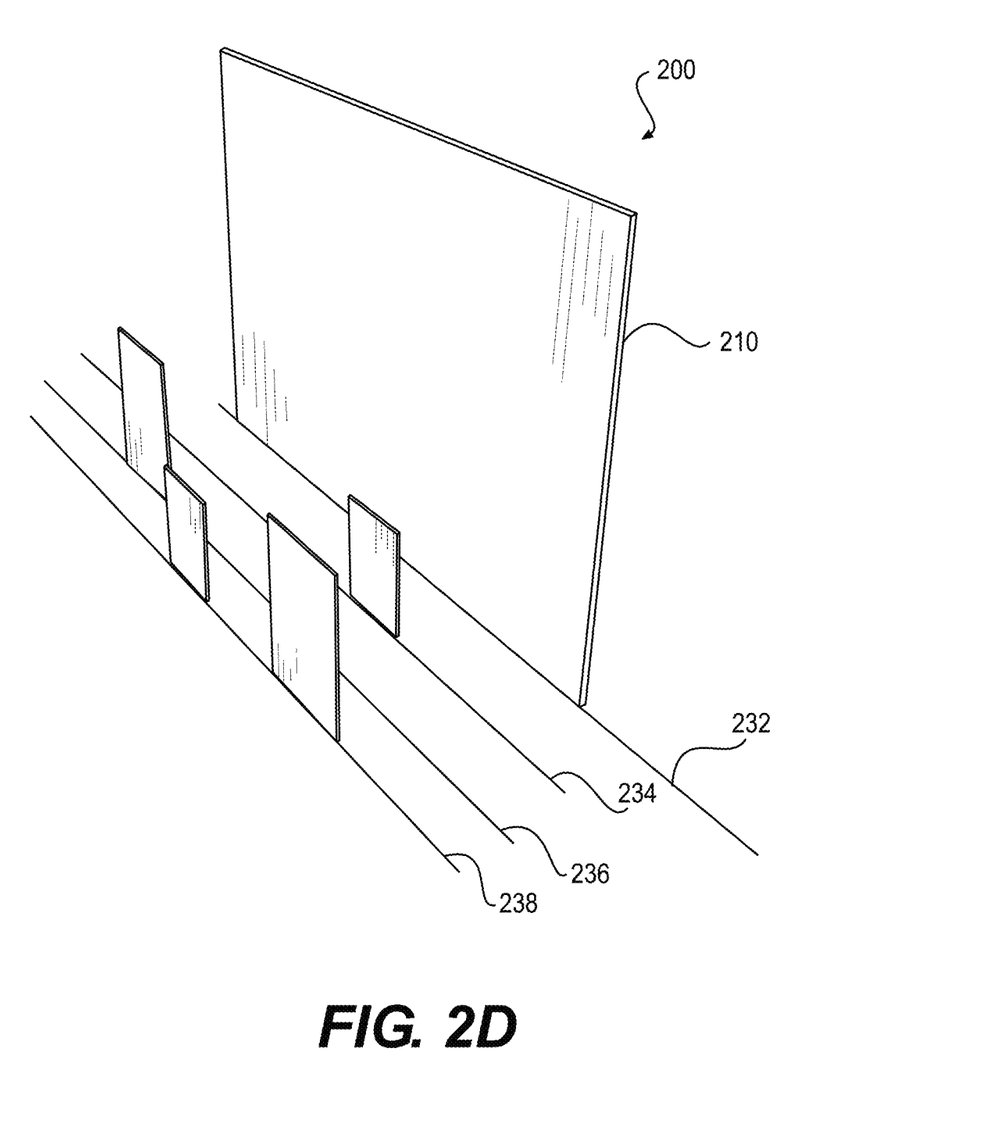

Referring now to the drawings, FIG. 1 is a sequence diagram showing operations of a method of projecting volumetric images onto a physical scene. In FIG. 1, sequence 100 comprises a plurality of operations that may be executed in variable order, some of the operations possibly being executed concurrently, some of the operations being repeated are various intervals, some of the operations being optional. The sequence 100 includes the following operations:

Operation 110: props are positioned within the physical scene in front of a background, optionally forming a plurality of layers in front of a rear layer formed by the background.

Operation 120: an image is projected onto the physical scene. The projected image represents a theme of a game played by a gamer and moves according to a game scenario and according to interactions of the gamer.

Operation 130: while some of the props may include a smooth face, other props may include a texture identified in this operation.

Operation 140: a portion of the image being projected on a given prop is optionally adapted according to a texture identified on the surface of the given prop.

Operation 150: as the gamer aims a pointer device at various points of the projected image, these points are optionally tracked in a continuous fashion Operation 160: an image portion of the physical scene being targeted by a pointer device is captured; the captured portion includes lighting points emitted by the physical scene; the lighting points within the captured portion forms a pattern specific to the captured portion.

Operation 170: a three-dimensional position of a target located within the captured portion is identified using the pattern specific to the captured portion as a reference; without limitation, the identified target may be a single pixel of the projected image corresponding to a center of the captured portion of the physical scene.

Operation 180: a triggering command is received at the pointer device.

Operation 190: a visible feature of the target is modified within the projected image in response to the triggering command; for example, a number of pixels surrounding a single targeted pixel may be illuminated with higher brilliance for a brief period of time.

In a variant of the sequence 100, the lighting points emitted by the physical scene may consist of infrared lighting points emitted by infrared light emitting diodes (LED) positioned throughout the physical scene, on the background and on the props. Using infrared light ensures that the gamer is not distracted by the lighting points. In the same or other variant of the sequence 100, positions of the props may be detected, for example using the camera, or may be defined using an operator console. The game scenario used as base for defining the projected image may be modified according to the number and positions of the props.

FIGS. 2a, 2b, 2c and 2d are perspective views, taken at various viewing angles, of an example of physical scene. In those Figures, a physical scene 200 includes a background 210, for example a flat screen as shown or a cylindrical screen, and several props 220. In the non-limitative example of FIGS. 2a-2d, the background 210 and the props 220 are positioned in a manner that forms four (4) layers 232, 234, 236 and 238. A minimum of one (1) prop 220 placed in a layer distinct from the layer 232 of the layer 232 of the background 210 is sufficient to form a volumetric image.

The contents and layout of the physical scene 200 may be tailored according to a particular game theme. As non-limitative examples, the physical scene 200 may include between 10 and 15 props 220, each prop having a height or a width of 8 inches or more. In the example of FIGS. 2a-2d, the background 210 is 8 feet high and 12 feet wide while the props 220 are 2 to 3 feet high and 1.5 to 2 feet wide. There is however no intrinsic limitation to the size of the physical scene 200 or to the number of its components.

Figure 3:
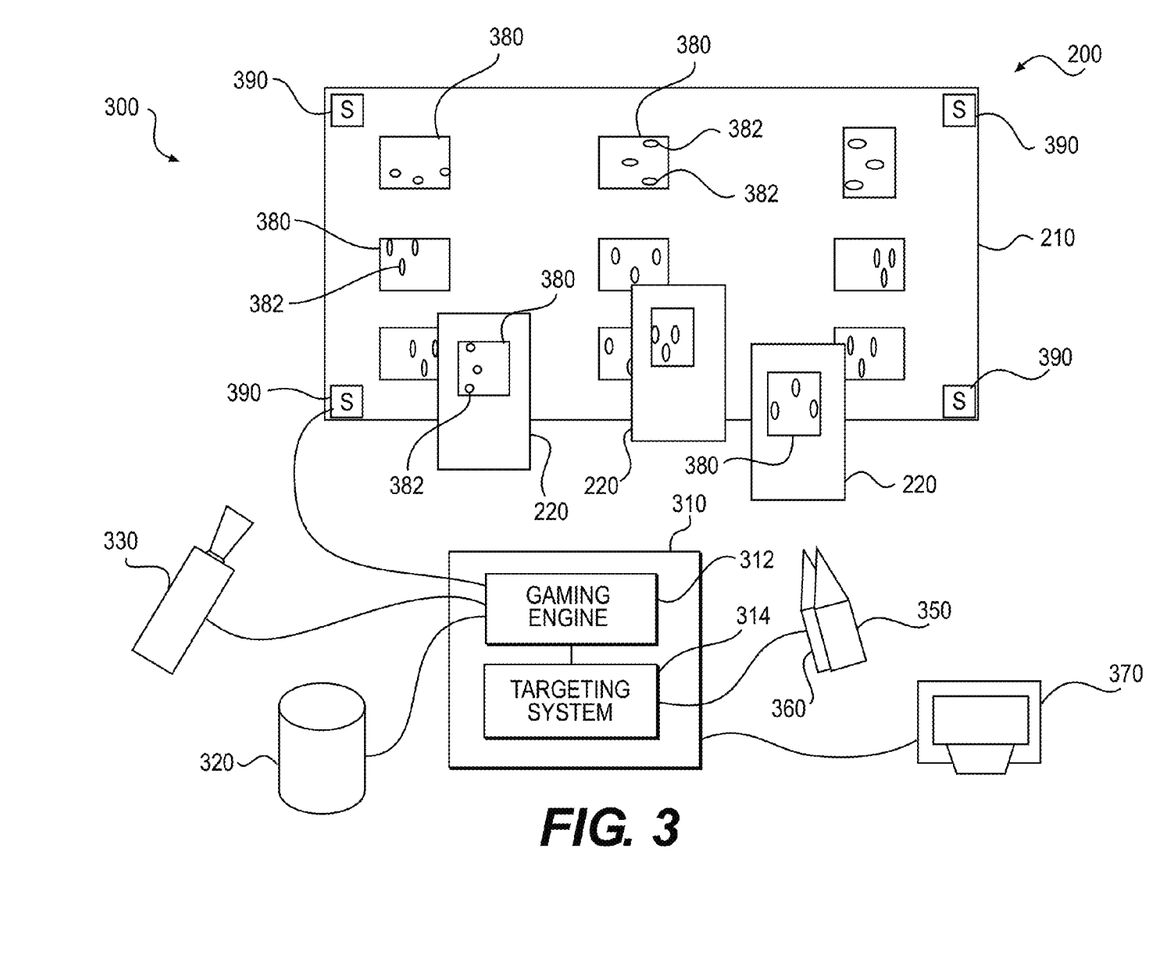
FIG. 3 is a block diagram of a gaming system for projecting volumetric images onto a physical scene.

FIG. 3 is a block diagram of a gaming system for projecting volumetric images onto a physical scene. A gaming system 300 includes the physical scene 200 of earlier Figures and its components; only three (3) props 220 are shown in order to simplify the illustration; however the gaming system 300 may include other numbers of props. The gaming system 300 also includes a controller 310 that incorporates a gaming engine 312 and a targeting system 314. The gaming engine 312 is used to play a virtual game to show results of a real time interaction between the gamer and the virtual game. The controller 310 may consist of one or more computer or processor. Each of the gaming engine 312 and of the targeting system 314 may be configured to be processed by one or more processors, the one or more processors being coupled to a memory. The gaming system 300 also includes a database 320 that may optionally be integrated in the controller 310 and that stores virtual theming information defining one or more game scenarios and corresponding images, a projector 330, a pointer device 350 (for example a gaming gun), a camera 360 that may be collocated with the pointer device 350, an operator console 370, a number of panels 380 distributed on the physical scene 200, each panel 380 including a variable number of light emitters, for example LEDs 382, the light emitters forming a specific pattern for each of the panels 380, and a number of light sensors 390 for example four (4) light sensors 390 substantially positioned on each corner of the background 210. Some of the elements of the gaming system 300 may not be present in all embodiments.

In the controller 310, the gaming engine 312 causes the projector 330 to project an image onto the physical scene 200. The pointer device 350, which may for example emulate a weapon such as a firearm or a laser gun, receives triggering commands from an operator, usually a gamer. A camera 360 captures an image of a portion of the physical scene 200 that is targeted by the pointer device 350 at the time of a triggering command. The captured portion includes lighting points emitted by several of the LEDs 382, for example all LEDs 382 of a single panel 380, or the LEDs 382 mounted on more than one panel 380, or the LEDs 382 mounted on fractions or a few adjacent panels 380. There is no a priori required number of lighting points in the captured portion, inasmuch as the number of lighting points and the pattern that they form is sufficient to uniquely identify the captured portion within the physical scene 200. The viewing angle of the camera 360 is selected in order to capture a sufficiently large portion of the physical scene 200 to ensure that the area being targeted by the gamer is properly identified.

In order to not disturb the projected image as seen by the gamer, the LEDs 382 may consist of infrared LEDs and the camera 360 may consist of an infrared camera.

The captured portion of the physical scene 200, including the unique pattern it contains, and information about the triggering command are provided to the controller 310, in which the targeting system 314 uses the pattern specific to the captured portion as a reference to identify, within the projected image, a three-dimensional position of a target at the time of the triggering command. The targeting system 314 causes the gaming engine 312 to modify, within the projected image, a visible feature of the target. The identification of the position of the target is made according to an analysis, by the targeting system 314, of the specific pattern in the portion of the physical scene 200 captured by the camera 360. Without limitation, the target may be identified as a pixel of the projected image corresponding to a central pixel of the captured portion of the physical scene 200. As a non-limiting example, modifying the visible feature of the target may comprise modifying this feature for a brief period of time or for the remainder of a gaming session. Generally, though the target may be limited to a single pixel or to a very small portion of the projected image, the modification of the visible feature is made with a sufficient size to be readily perceivable by the gamer.

In an embodiment, the projector 330 is a 2D projector, the gaming system 300 providing a feeling of immersion to gamers by the volume formed by the placement of the props 220 in front of the background 210. In the same or other embodiment, two projectors 330 concurrently controlled by the gaming engine 312 may be used to project a shadowless image onto the physical scene 200.

The light sensors 390 located on four (4) corners of the physical scene 200, on the background 210, are connected to the gaming engine 312 (only one such connection is shown for simplicity of the illustration of FIG. 3). The light sensors 390 detect light of a calibration image projected by the projector 330, usually when installing or recalibrating the gaming system 300 between gaming sessions. This information is used by the gaming engine 312 to determine a position of the projector 340 in front of the physical scene 200, filter the image on a volume of each prop 220, accounting for distances and for angles of arrival of the image of the props 220, for dewarping the projected image and for adjusting its size.

Positions of the background 210 and of the props 220 within the physical scene 200 can be defined at the operator console 370 and provided to the controller 310. Alternatively or in addition, the layers of the physical scene 200 may be defined by determining positions of the background 210 and of the props 220, the background 210 forming a rearmost layer 232 and the props 220 being disposed in one or more additional layer 234, 236, 238. Layer determination may be example by determined by the targeting system 314, based on a plurality of successive captures by the camera 360, or based on information provided at the operator console 370. Information about the identified layers 232-238 may be used in the identification of the 3D position of the target.

Regardless of the manner in which position information of the various elements of the physical scene 200 is obtained, the gaming engine 312 can modify the projected image as a function of the positions of the props 220. In a particular variant, the gaming engine 312 can use 3D positions of the props 220 to modify the projected image so that an object within the image, as defined in the game scenario, is hidden by a given prop 220 when the game scenario causes that object to move behind the given prop 220.

In an embodiment, the targeting system 314 also identifies a 3D position of the pointer device 350 based on portions of the physical scene 200 captured by the camera 360. In this embodiment, the targeting system 314 can identity a trajectory between the pointer device 350 and the target based on the 3D position of the pointer device 350 and on the 3D position of the target.

In yet another variant, at least one of the props 220 may be an animated prop, or animatronic, controlled by the gaming engine 312. For example, according to the game scenario, the gamer may identify the animatronic as a target and "shoot" this target, causing the animatronic to move.

Though FIG. 3 shows a single panel 380, mounted on each of the props 220, each panel 380 as shown having three (3) LEDs 382, in a practical realization, other numbers of panels 380 and other numbers of LEDs 382 may be mounted on each of the props 220, depending for example on the size of the props 220 and on the particulars of a game scenario. It has been observed that, in some particular situations, light emitted from a given LED 382 mounted on a given panel 380 may be accidentally detected and "pollute" the perception of a pattern of LEDs 382 mounted on another panel 380. It has been observed that forming patterns of six (6) LEDs 382 on each panel is useful in mitigating this pollution effect. Some of the props 220 may not comprise any panel 380. Likewise, various numbers of panels 380 may be mounted on the background 210. The overall number and placement of the panels 380 and the number of LEDs 382 per panel will depend in part on requirements for a particular game in terms of accuracy and precision of target identification.

Figure 4A:
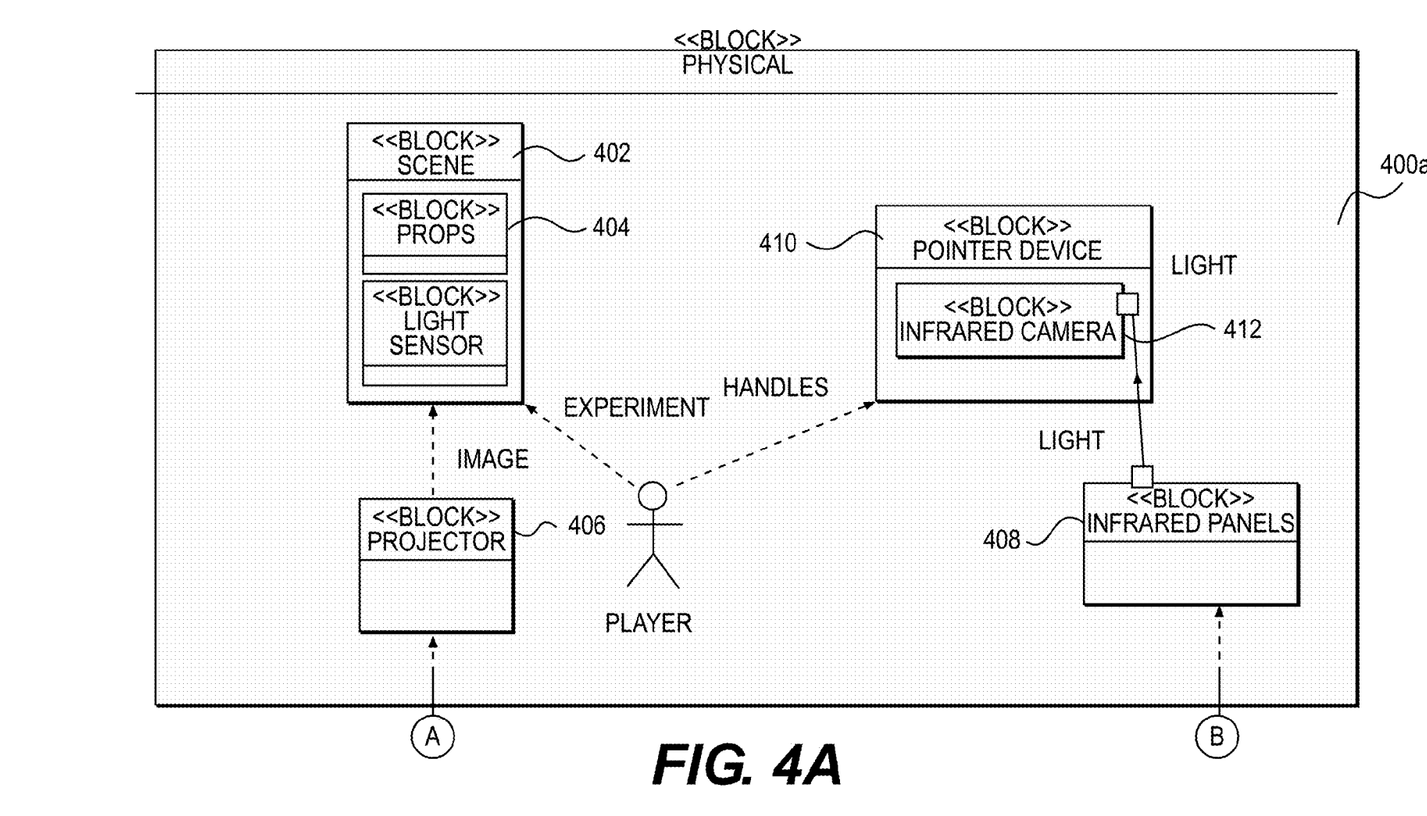
FIGS. 4a and 4b illustrate a software structure corresponding to the gaming system of FIG. 3.
Figure 4B:
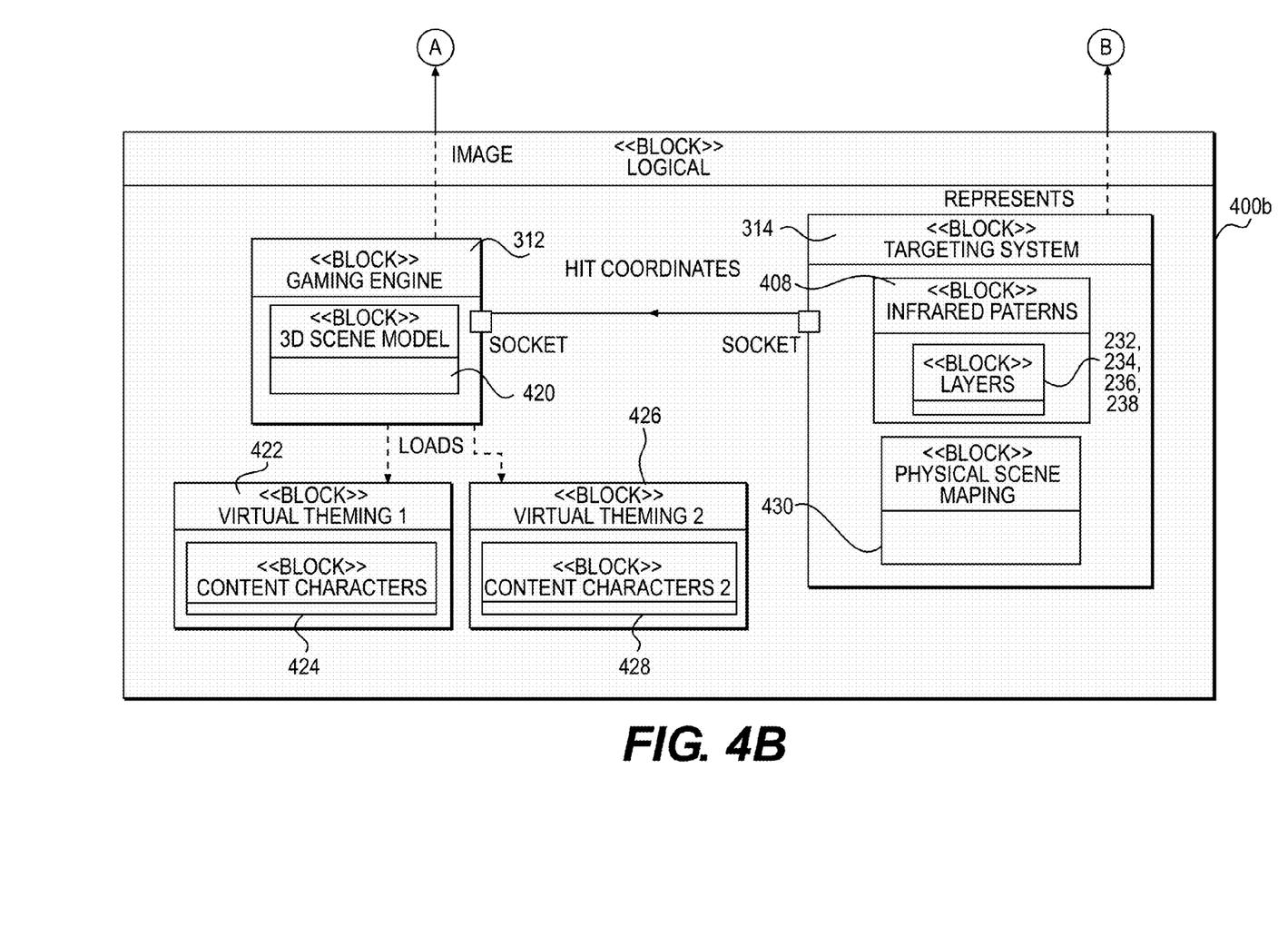

FIGS. 4a and 4b illustrate a software structure corresponding to the gaming system of FIG. 3. FIGS. 4a and 4b are connected via connectors 'A' and 'B' and respectively show a software structure 400a representing elements of the gaming system 300 that are external to the controller 310 and a software structure 400b representing elements implemented within the controller 320 and in the database 320. The complete software structure 400a, 400b may be implemented within the controller 310. Referring at once to FIGS. 4a and 4b, the controller 310 has logical representations (LR) of the external elements of the gaming system 300: a background LR 402, a props LR 404, a projector LR 406, a panels LR 408, a pointer device LR 410 and a camera LR 412.

The gaming engine 312 receives, from the database 320, virtual theming information 422, 426, respectively including content characters 424 and 428, and uses this virtual information to construct a 3D scene model 420. Generally, distinct blocks of virtual theming information may relate to distinct games and/or game scenarios. The gaming engine 312 controls the projected image as a function of the 3D scene model 420.

The 3D scene model provides high fidelity modeling of the physical scene 200. It coordinates details about the scene and positions of the physical elements. It defines objects of a game scenario that are projected on the physical scene 200 by the projector 330. It defines artistic details used to generate the projected image.

The targeting system 314 uses information obtained from the camera LR 412 to define the layers 232, 234, 236 and 238, the layers being usable to define 3D coordinates throughout the physical scene 200, and to define trajectories between the pointer device 350 and the targets.

A physical scene mapping 430 contains a high fidelity mapping of the physical scene 200. Layer information and position information of the panels 380, possibly adding position information provided at the operator console 370 and/or cumulative position information gathered from the camera LR 412, is used to populate the physical scene mapping 430. When informed of a triggering action of the gamer by the pointer device LR 410, the targeting system 314 applies current information from the camera LR 412 to the physical scene mapping 430 to provide 3D coordinates of the target designated by the gamer to the gaming engine 312. The gaming engine 312 uses these 3D coordinates of the target to modify the 3D scene model, in turn modifying the projected image.

In a non-limitative realization example, the software structure 400a, 400b may be implemented using a Systems Modeling Language (SYSML), each component of the software structure 400a, 400b consisting of a stereotype.

Figure 5:
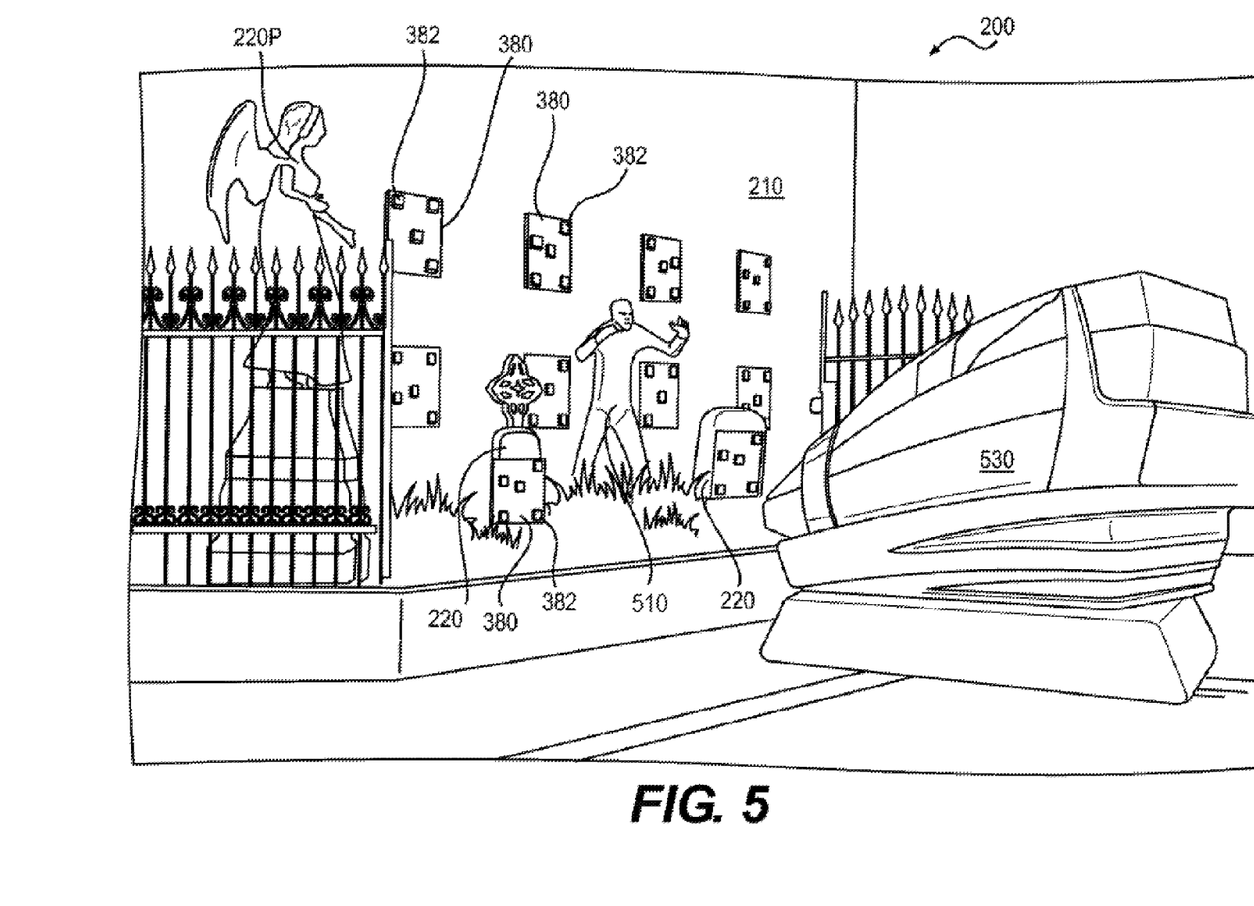
FIG. 5 is a perspective view of an example of a real physical scene.

FIG. 5 is a perspective view of an example of a real physical scene. Most of the elements shown on FIG. 5 are real, physical elements, with the exception of a character (zombie) 510, which is virtual and part of a projected image. Most of the props 220 are "active" since panels 380 having LEDs 382 are mounted thereon. One prop 220P is "passive" and may not interact with the game action, being only present as a decorative element. On the background 210 and on the props 220, the panels 380 each include a number of LEDs 382 forming distinct unique patterns. An optional cart 530 (a vehicle) including a station (not shown) for the gamer is installed in front of the physical scene. The gamer sits at the station in the cart 530, the pointer device 350 and the camera 360 also being mounted in the cart 530. The gamer controls movements of the cart 530 in front of the physical scene 200, using controls (not shown) providing commands to the gaming engine 312. Laser trajectories 540 are shown for illustration and may not be visible in an application.

Figure 6:
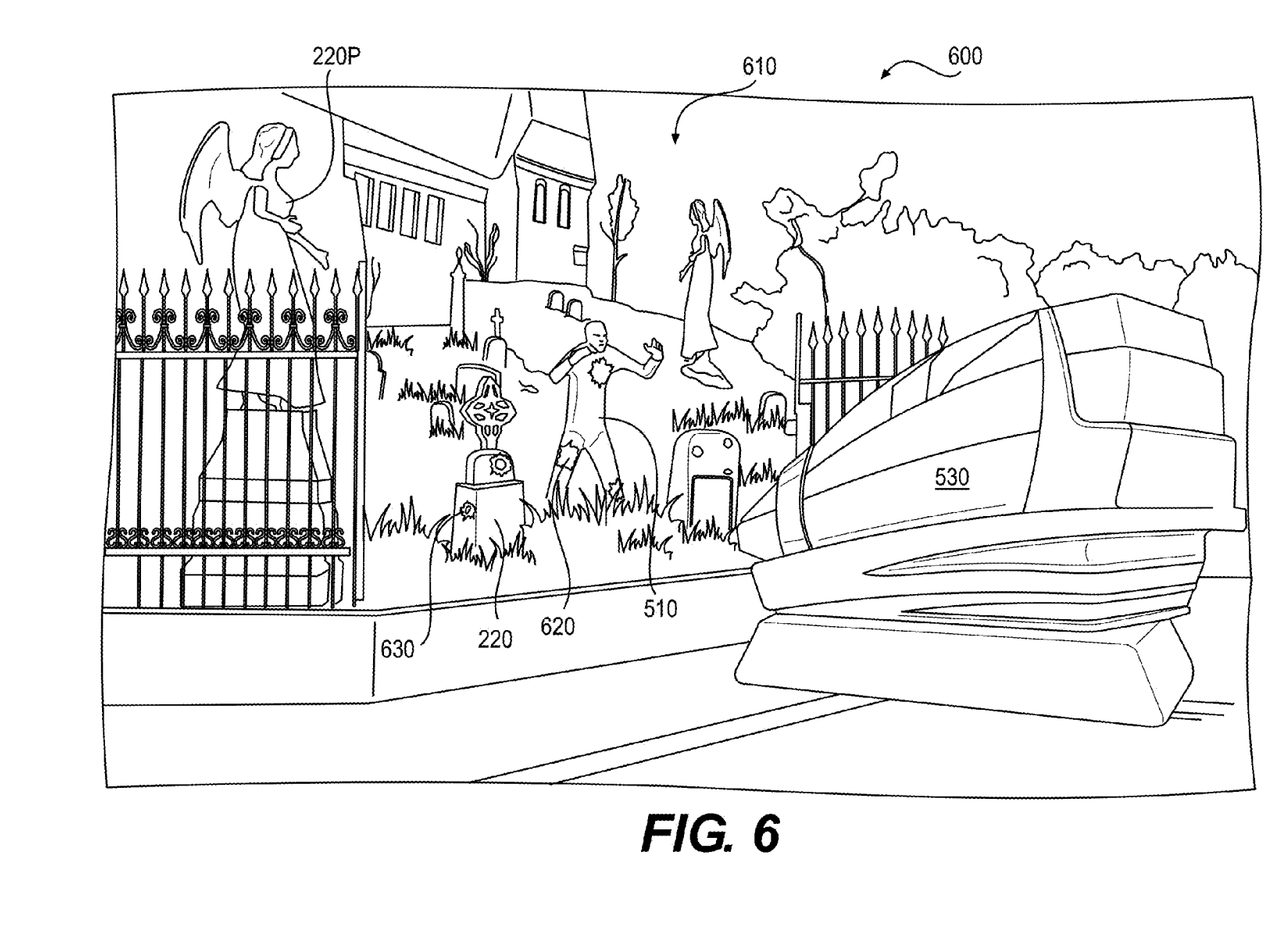
FIG. 6 is a perspective view of an example of a virtual scene obtained by projecting a volumetric image on the real physical scene of FIG. 5.

FIG. 6 is a perspective view of an example of a virtual scene obtained by projecting a volumetric image on the real physical scene of FIG. 5. A virtual scene 600 shows an image 610 projected on the background 200 (not specifically visible on FIG. 6) and on the props 220, 220P. Visible features of the image of the zombie 510 are being modified by the gaming engine by simulating bullet impacts 620 resulting from the gamer having targeted the points of impacts 620 and having given triggering commands on the pointer device 350. The simulated bullet impacts 620 may appear for a brief period, for example for a few seconds, so that consecutive impacts 620 may be concurrently highlighted. Instead of bullet impacts, laser beam impacts or explosions could also be simulated.

In the example of FIG. 6, previous targets 630 having been hit by bullets continue showing signs of bullet impacts. For showing the previous targets 630, the game scenario actuated by the gaming engine 312 causes the projected image to be defined in part by previous actions of the gamer.

It should be observed that the points of impacts 620 and previous targets 630 are not limited to positions of the various LEDs 382 of FIG. 5, since the patterns formed by the LEDs 382 are used to provide image referencing to the gaming system 300 and not to limit the position of the targets. The targets may be formed on any pixel of the image 610.

Those of ordinary skill in the art will realize that the present description of the gaming systems and method are illustrative only and are not intended to be in any way limiting. Other embodiments will readily suggest themselves to such persons with ordinary skill in the art having the benefit of the present disclosure. Furthermore, the disclosed gaming systems and method may be customized to offer valuable solutions to existing needs and problems of providing a feeling of immersion to gamers.

In the interest of clarity, not all of the routine features of the implementations of the gaming systems and method are shown and described. It will, of course, be appreciated that in the development of any such actual implementation of the gaming systems and method, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of gaming systems having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer or a machine and those operations may be stored as a series of instructions readable by the machine, they may be stored on a tangible medium.

Systems and modules described herein may comprise software, firmware, hardware, or any combination(s) of software, firmware, or hardware suitable for the purposes described herein. Software and other modules may reside on servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A gaming system projecting volumetric images onto a physical scene, the physical scene including a background and a plurality of props positioned in front of the background, comprising:
   a projector;
   a gaming engine operably connected to the projector and adapted to cause the projector to project an image onto the physical scene;
   a console for defining positions of the background and of the props within the physical scene;
   a plurality of light emitters positionable on the physical scene;
   a pointer device adapted to receive triggering commands from an operator;
   a camera adapted to capture an image of a portion of the physical scene being targeted by the pointer device, the captured portion including lighting points emitted by at least a subset of the plurality of light emitters, the lighting points within the captured portion being arranged in a pattern specific to the captured portion; and
   a targeting system adapted to use the pattern specific to the captured portion as a reference to identify, within the projected image, a three-dimensional position of a target and to cause the gaming engine to modify within the projected image a visible feature of the target when a triggering command is received at the pointer device.

2. The system of claim 1, wherein the light emitters are infrared light emitting diodes (LED) and the camera is an infrared camera.

3. The system of claim 1, wherein the plurality of light emitters includes a first plurality of light emitters positionable on the background and a second plurality of light emitters positionable on the props.

4. The system of claim 1, comprising:
   a plurality of light sensors operably connected to the gaming engine and positionable on the physical scene;
   wherein the gaming engine is configured to use signals obtained from the light sensors to determine a position of the projector in relation to the physical scene.

5. The system of claim 4, wherein the gaming engine is configured to modify the projected image as a function of the position of the projector in relation to the physical scene.

6. The system of claim 4, wherein the gaming engine is configured to dewarp the projected image.

7. The system of claim 1, wherein the gaming engine is configured to detect the positions of the props in three dimensions and to modify the projected image so that an image object located behind a given prop is hidden by the given prop.

8. The system of claim 1, wherein the targeting system is configured to identify layers of the physical scene based on the positions of the background and of the props, the background forming a rearmost layer and the props being disposed in one or more additional layer, information about the identified layers being used in the identification of the three-dimensional position of the target.

9. The system of claim 1, wherein the pointer device and the camera are collocated.

10. The system of claim 1, wherein the pointer device emulates a weapon.

11. The system of claim 10, wherein the gaming engine is configured modify the projected image by simulating the target being hit by a bullet or by a laser beam.

12. The system of claim 10, wherein the gaming engine is configured to modify the visible feature of the target by simulating an explosion of the target.

13. The system of claim 1, comprising two projectors controlled by the gaming engine to project a shadowless image onto the physical scene.

14. The system of claim 1, wherein the projector is a two-dimensional projector.

15. The system of claim 1, comprising a cart adapted to move under control of the gaming engine, the cart including an operator station, the pointer device being mounted in the cart.

16. The system of claim 1, comprising a database operably connected to the gaming engine, the database containing a theme for forming the projected image and a game scenario.

17. The system of claim 1, comprising an animated prop positionable among the props and controlled by the gaming engine.

18. A gaming system projecting volumetric images onto a physical scene, the physical scene including a background and a plurality of props positioned in front of the background, comprising:
   a projector;
   a gaming engine operably connected to the projector and adapted to cause the projector to project an image onto the physical scene;
   a plurality of light emitters positionable on the physical scene;

a pointer device adapted to receive triggering commands from an operator;

a camera adapted to capture an image of a portion of the physical scene being targeted by the pointer device, the captured portion including lighting points emitted by at least a subset of the plurality of light emitters, the lighting points within the captured portion being arranged in a pattern specific to the captured portion; and a targeting system adapted to use the pattern specific to the captured portion as a reference to identify, within the projected image, a three-dimensional position of a target and to cause the gaming engine to modify within the projected image a visible feature of the target when a triggering command is received at the pointer device;

wherein the gaming engine and the targeting system are integrated in a controller having logical representations of the background, of the props, of the projector, of the light emitters, of the pointer device and of the camera.

19. A gaming system projecting volumetric images onto a physical scene, the physical scene including a background and a plurality of props positioned in front of the background, comprising:

a projector;

a gaming engine operably connected to the projector and adapted to cause the projector to project an image onto the physical scene;

a plurality of light emitters positionable on the physical scene;

a pointer device adapted to receive triggering commands from an operator;

a camera adapted to capture an image of a portion of the physical scene being targeted by the pointer device, the captured portion including lighting points emitted by at least a subset of the plurality of light emitters, the lighting points within the captured portion being arranged in a pattern specific to the captured portion; and a targeting system adapted to use the pattern specific to the captured portion as a reference to identify, within the projected image, a three-dimensional position of a target and to cause the gaming engine to modify within the projected image a visible feature of the target when a triggering command is received at the pointer device;

wherein the targeting system is configured to identify a three-dimensional position of the pointer device based on the image of the portion of the physical scene captured by the camera; and wherein the targeting system is further adapted to identify a trajectory between the pointer device and the target based on the three-dimensional position of the pointer device and on the three-dimensional position of the target.

20. A gaming system projecting volumetric images onto a physical scene, comprising:

a background of the physical scene;

a plurality of props positioned in front of the background;

a projector;

a gaming engine operably connected to the projector and adapted to cause the projector to project an image onto the background and onto the props;

a console for defining positions of the background and of the props within the physical scene;

a plurality of light emitters, including a first plurality of light emitters positioned on the background and a second plurality of light emitters positioned on the props;

a pointer device adapted to receive triggering commands from an operator;

a camera adapted to capture an image of a portion of the physical scene being targeted by the pointer device, the captured portion including lighting points emitted by at least a subset of the plurality of light emitters, the lighting points within the captured portion forming a pattern specific to the captured portion; and a targeting system adapted to use the pattern specific to the captured portion as a reference to identify, within the projected image, a three-dimensional position of a target and to cause the gaming engine to modify within the projected image a visible feature of the target when a triggering command is received at the pointer device.

21. The system of claim 20, wherein at least one of the props is an animatronic controlled by the gaming engine.

22. A method of projecting volumetric images onto a physical scene, the physical scene including a background and a plurality of props positioned in front of the background, comprising:

defining positions of the background and of the props within the physical scene;

projecting an image onto the physical scene;

capturing an image of a portion of the physical scene being targeted by a pointer device, the captured portion including lighting points emitted by the physical scene, the lighting points within the captured portion forming a pattern specific to the captured portion;

using the pattern specific to the captured portion as a reference to identify, within the projected image, a three-dimensional position of a target located within the captured portion;

receiving a triggering command at the pointer device; and modifying within the projected image a visible feature of the target in response to the triggering command.

23. The method of claim 22, comprising positioning the props within the physical scene in a plurality of layers in front of the background.

24. The method of claim 22, comprising identifying a texture on a surface of a given prop.

25. The method of claim 24, comprising adapting a portion of the image being projected on the given prop according to the texture on the surface of the given prop.

26. The method of claim 22, comprising continuously tracking points on the projected image being targeted by the pointer device.

* * * * *